(12) United States Patent
Rosel et al.

(10) Patent No.: US 7,272,541 B2
(45) Date of Patent: Sep. 18, 2007

(54) METHOD AND SYSTEM FOR GENERATING AND HANDLING A HARMONIZED NETWORK OF POINTS

(75) Inventors: Sebastien Rosel, Gif/Yuette (FR); Thierry Rouf, Massy (FR)

(73) Assignee: Dassault Systems (FR)

( * ) Notice: Subject to any disclaimer, the term of this patent is extended or adjusted under 35 U.S.C. 154(b) by 608 days.

(21) Appl. No.: 09/788,231

(22) Filed: Feb. 16, 2001

(65) Prior Publication Data

US 2005/0055182 A1    Mar. 10, 2005

(51) Int. Cl.
*G06F 17/90* (2006.01)
*G09G 5/00* (2006.01)
*G06K 9/00* (2006.01)
*G06T 15/00* (2006.01)
*G06F 15/00* (2006.01)

(52) U.S. Cl. .......................... 703/2; 345/419; 345/619; 382/154; 715/502

(58) Field of Classification Search ................ 700/182; 345/419, 619; 703/2; 715/964; 382/154
See application file for complete search history.

(56) References Cited

U.S. PATENT DOCUMENTS

| | | | | |
|---|---|---|---|---|
| 5,255,352 A | * | 10/1993 | Falk ........................... | 345/582 |
| 5,510,995 A | * | 4/1996 | Oliver ........................ | 700/182 |
| 5,883,631 A | * | 3/1999 | Konno et al. ................ | 345/423 |
| 6,016,487 A | * | 1/2000 | Rioux et al. .................. | 707/2 |
| 2004/0085311 A1 | * | 5/2004 | Lee et al. .................... | 345/419 |

OTHER PUBLICATIONS

Liu-J.P. et al., "Contrained Smoothing B-Spline Curve Fitting For Ship Hull Generation and Fairing", Computer Applications in the Automation of Shipyard Operation and Ship Design VII, p. 247-258 vol. B-5 Sep. 13, 1991.*

Vida-J et al., "A Survey of Blending Methods that use Parametric Surfaces" Computer Aided Design, Elsevier Publishers BV., Barking, GB May 1, 1994, p. 341-365.*

Watt-A, "3-D Computer Graphics (Third Edition)" Chapters 3.4-3.6.2, Addison-Wesley, p. 109-110, figure 3.37, 2000.*

Peters-J., "Smooth Patch of Refined Triangulation" ACM transactions on graphics, vol. 20, No. 1, Jan. 2001, p. 1-9.*

Krishnamurthy et al., "Fitting Smooth Surfaces to Dense Polygon Meshes" Computer Graphics Proceedings, Annual Conference Series, pp. 313-324. 1996.*

A. Watt, "3D Computer Graphics (Third Edition)" Chapters 3.4-3.6.2, *Addison-Wesley*, p. 109-110, figure 3.37, 2000.

J.P. Liu et al., "Constrained Smoothing B-Spline Curve Fitting for Ship Hull Generation and Fairing", *Computer Applications in the Automation of Shipyard Operation and Ship Design VII*; pp. 247-258, vol. B-5, Sep. 13, 1991.

(Continued)

*Primary Examiner*—Anthony Knight
*Assistant Examiner*—Tom Stevens
(74) *Attorney, Agent, or Firm*—Victor Siber, Esq.; Clifford Chance US LLP

(57) ABSTRACT

This invention presents methods and systems for generating and handling a harmonized network of points. More generally, this invention reorganizes and optimizes a network of points in terms of spatial distribution regularity. Implementations may allow users to manipulate the network of points while maintaining the organization of the network of points. The network of points can define a surface, which can include Béziers and Nurbs three-dimensional surfaces. The surface can be used in a CAD system.

29 Claims, 12 Drawing Sheets

OTHER PUBLICATIONS

J. Vida et al., "A Survey of Blending Methods that use Parametric Surfaces", *Computer Aided Design, Elsevier Publishers BV., Barking, GB*, pp. 341-365, vol. 26, No. 1, May 1, 1994.

Communication dated Apr. 20, 2004 for EP application No. 02290267.0.

* cited by examiner

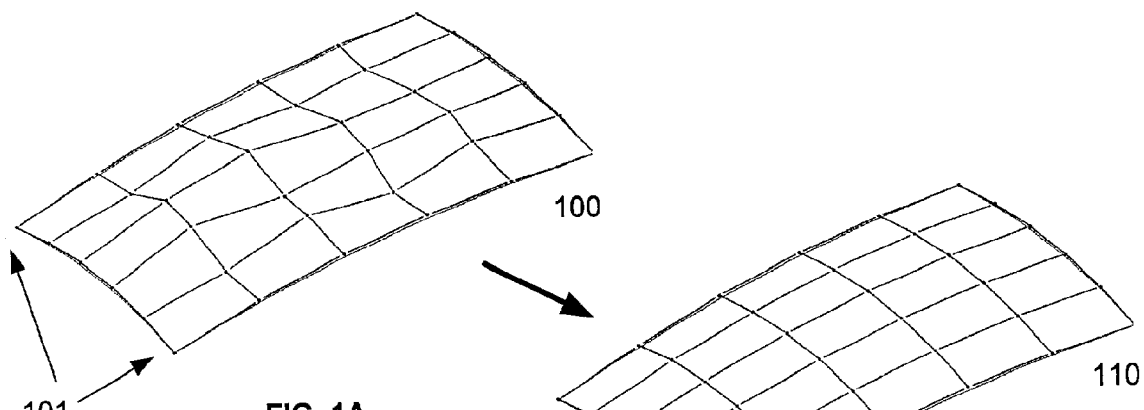
FIG. 1A
FIG. 1B
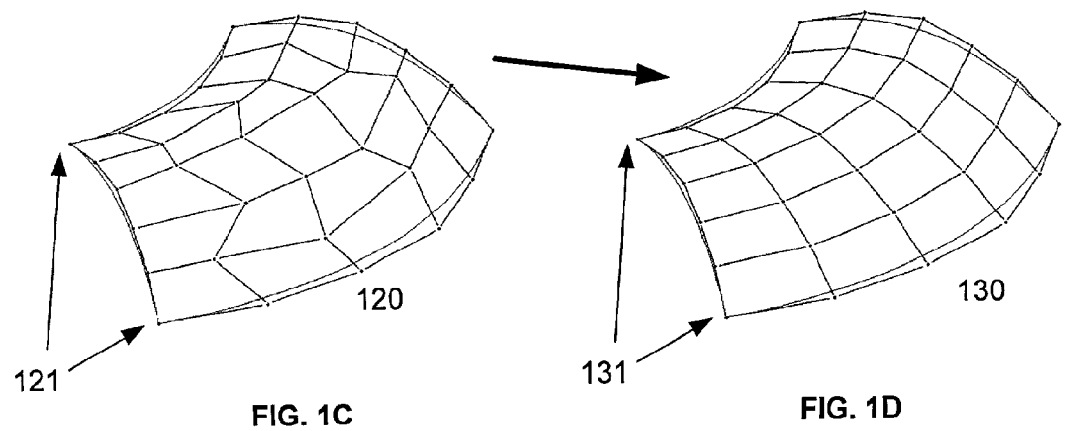
FIG. 1C
FIG. 1D

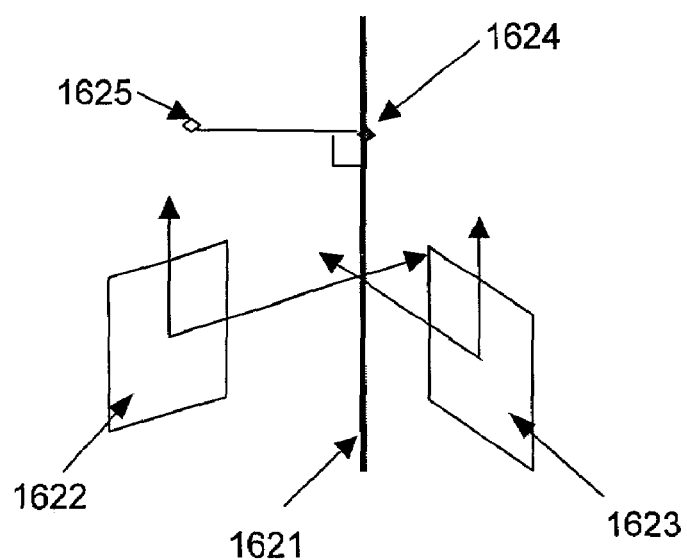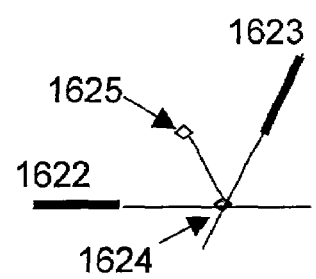
FIG. 16C
FIG. 16D

METHOD AND SYSTEM FOR GENERATING AND HANDLING A HARMONIZED NETWORK OF POINTS

BACKGROUND

In computer-aided design ("CAD"), designers use computers to model three-dimensional objects to assist in the design and manufacture of parts. To implement these models, CAD programs use surfaces to represent three-dimensional objects. Examples of mathematical surface models include Béziers and Nurbs surfaces. One classical way of defining such surfaces is by means of a network of control points. The control points that control the surface are not necessarily on the surface. FIG. 4 shows an example of a surface and the control points that control the surface. As can be seen, only the control points on the four-corners are on the surface. The other control points affect the surface, but are usually not on the surface.

When surfaces are designed, the surfaces may not be uniform or of high quality. FIG. 1A is an example of a three-dimensional surface defined by points in a network that is not uniform or of high quality.

The shape and smoothness of surfaces is particularly important when the surface is visible in a product. These visible surfaces, such as CLASS_A surfaces, are typically used in vehicle and consumer goods. For example, a car hood is a CLASS_A surface that must be smooth because the smoothness can affect how a potential buyer views the car. When the car is displayed in a car showroom, light reflects off the car hood. If the car hood is smooth and regular, the light reflects in an aesthetically pleasing matter. If the car hood is rough or irregular, the light can reflect in a strange pattern that can negatively affect a potential buyer.

Currently, creating high quality CLASS_A surfaces can require a strong expertise, particularly to obtain a good organization of the control points for these surfaces. This organization can be obtained manually by allowing a designer to manipulate individual points using a user interface and control point handling. The designer can start by amplifying the defects by compressing or changing the sights, or zooming into and out of the surface. After amplifying the defects, the designer usually has to manipulate individual control points in the network of points. The designer then views the surface to determine if it is of sufficient quality. The designer can manipulate the same or other control points, and view the results. The designer can repeat this process until satisfied with the smoothness or uniformity of the surface. As individual control points are changed, unrelated parts of the surface can be negatively affected. The designer usually has to consider this as the designer attempts to increase the quality of the surface. This methodology can be difficult and expensive to implement. This invention addresses some of these issues.

SUMMARY

The present invention relates to a method and system for generating and handling a harmonized network of points. More generally, this invention reorganizes and optimizes a network of points in terms of spatial distribution regularity. Implementations may allow users to manipulate the network of points while maintaining the organization of the network of points.

In one aspect of this invention, a computerized method for manipulating control points is presented. The control points form rows along two non-parallel directions U and V. This method includes adjusting the position of a control point in an intermediary row in the U direction to provide a smooth transition from the row of control points corresponding to a first edge along the U direction to a row of control points corresponding to a second edge along the U direction. The position of the control point is also adjusted in an intermediary row in the V direction to provide a smooth transition from the row of control points corresponding to a first edge along the V direction to a row of control points corresponding to a second edge along the V direction. The new position of the control point is computed based on the corresponding adjusted positions of the control point in the intermediary row in the U direction and the control points in the intermediary row in the V direction.

Implementations may include one or more of the following features. The computation of the new position of the control point can include averaging the adjusted position of the control point in the intermediary row in the U direction and the adjusted position of the control point in the intermediary row in the V direction. The method can also include determining a reference axis for the first edge along the U direction, the second edge along the U direction, the first edge along the V direction, and the second edge along the V direction.

In another aspect of this invention, a computerized method for manipulating a plurality of control points, the control points forming rows along two non-parallel directions U and V, is presented. A first row in the U direction is identified corresponding to a control point. A determination is made if a row of control points corresponding to a first edge along the U direction and the first row belongs in a first U plane. A determination is made if a row of control points corresponding to a second edge along the U direction and the first row belongs in a second U plane. The control point is adjusted using the first U plane and the second U plane. The adjustment only occurs if the row of control points corresponding to the first edge along the U direction belongs in the first U plane and the row of control points corresponding to the second edge along the U direction belongs in the second U plane.

Implementations may include the following features. This method can be repeated in the V direction. An adjusted U plane can be computed for the control point to provide a smooth transition between the first U plane and the second U plane. An adjusted V plane can be computed for the control point to provide a smooth transition between the first V plane and the second V plane. The control point can be projected on an intersection of the adjusted U plane and the adjusted V plane. The control point can be projected on the adjusted U plane. The control point can be projected on the adjusted V plane.

In another aspect of this invention, a computerized method for manipulating a plurality of control points, the plurality of control points forming a plurality of rows along two non-parallel directions U and V. The method includes identifying a first row in the U direction corresponding to a control point. It is determined if a row of control points corresponding to a first edge along the U direction and the first row belongs in a first U plane. It is determined if a row of control points corresponding to a second edge along the U direction and the first row belongs in a second U plane. The control point is constrained using the first U plane and the second U plane, wherein the constraining only occurs if the row of control points corresponding to a first edge along the U direction belongs in the first U plane and the row of control points corresponding to the second edge along the U direction belongs in the second U plane.

The control points in these methods can define a surface, which can include Béziers surfaces and Nurbs surfaces. The surface can be represented in a CAD system. The surface can also include a three-dimensional surface.

The methods described can be implemented in a computer system that includes a computer, which contains a memory, and a processor, and executable software residing in the computer memory. Similarly, the methods can be implemented in a computer data signal embodied in a digital data stream.

Implementations may include one or more of the following advantages. The solution obtained corresponds to the designer's CLASS_A expectations in terms of surface quality received through alignment criteria and positioning of the control points. The times to create and modify the surface can be greatly reduced.

In addition, all the further modifications of the smoothed surface can be done using constrains in order to preserve the homogeneity of the network based on the smoothing defined in the first step.

DESCRIPTION OF THE DRAWINGS

FIG. 1A-D are illustrations of surfaces before and after the harmonization process has been applied.

FIG. 16A-D is an illustration of the plane projection method.

DETAILED DESCRIPTION

Figure 2:
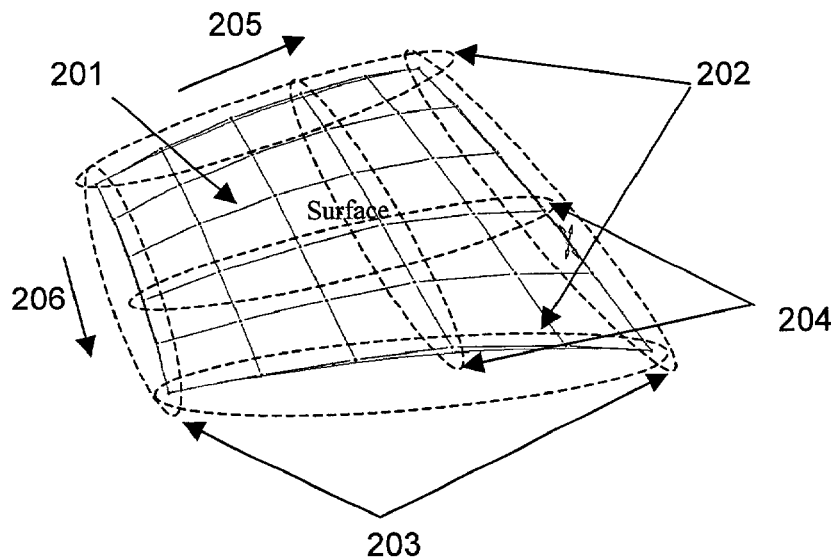
FIG. 2 is an illustration of a surface containing rows.

The present invention relates to a method and system for generating and handling a harmonized network of points. More generally, this invention reorganizes and optimizes a network of points in terms of spatial distribution regularity. Implementations may allow users to manipulate the network of points while maintaining its organization.

FIG. 1 presents two examples of the results of the harmonization of the surface using an implementation of this invention. In a first example, FIG. 1A shows a non-uniform surface 100 that is in need of reorganization (i.e., smoothing), and FIG. 1B shows the same surface 110 after applying the harmonization method 120. In a second example, FIG. 1C presents the non-uniform surface 120, and FIG. 1D shows the same surface 120 after applying the harmonization method 130. In both examples, the control point edges (such as edges 101, 111, 121, and 131) on the non-uniform surface 100 and 120 are not changed on the harmonized surface 110 and 130.

As used in this invention, a grid of points relating to a surface can be expressed as an array. FIG. 2 shows the surface 201 controlled by a network of control points (not shown). The two directions of this array are called the U direction 205 and the V direction 206. The lines of points forming the edges of this network are called the edges U 202 and the edges V 203. The internal lines are called rows 204.

Figure 8:
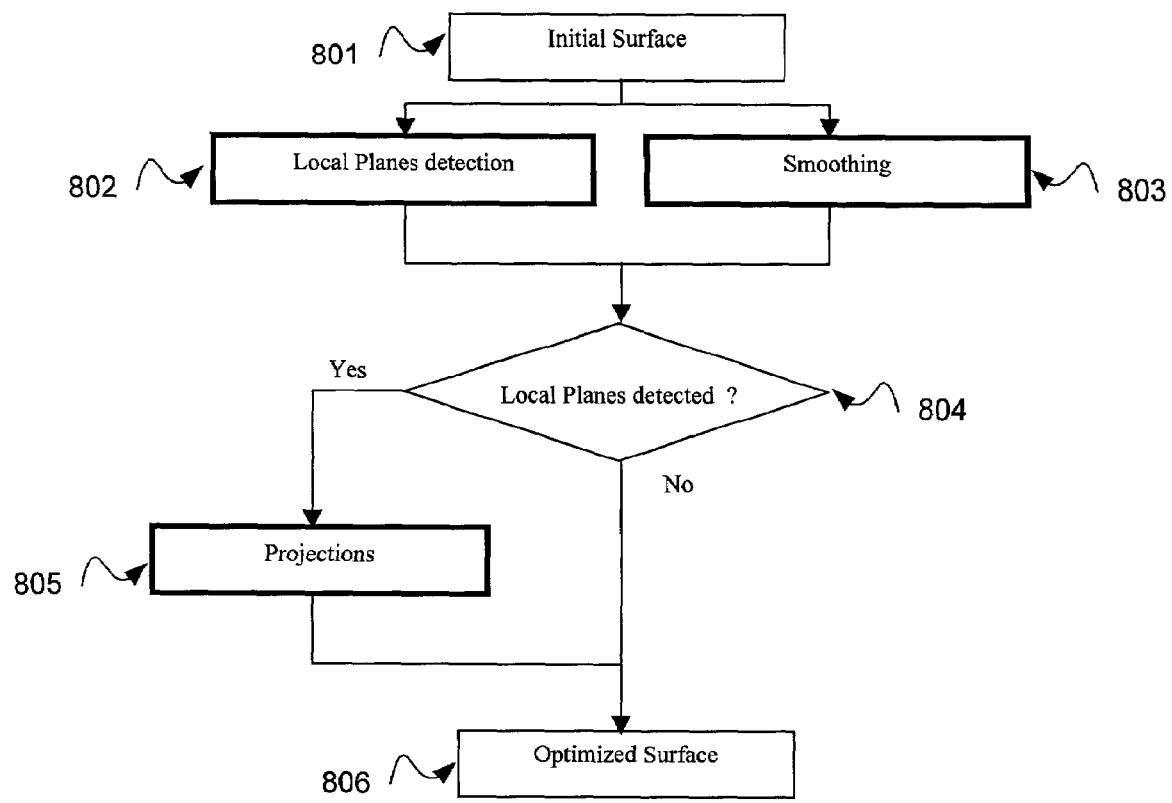
FIG. 8 is a flowchart of the harmonization method.

In one embodiment of this invention, the harmonization of the network of points can be divided into three phrases. FIG. 8 presents a flowchart of this arrangement. The method starts with an initial surface that needs to be optimized 801, such as FIG. 1A or FIG. 1C. A smoothing method is used on the surface 803. Local planes are detected to determine whether projections will be applied 802. If local planes are detected 804, then a projection method is applied to further smooth the surface 805. The results of this harmonization is an optimized surface 806, such as FIG. 1B or FIG. 1D.

Figure 5A:
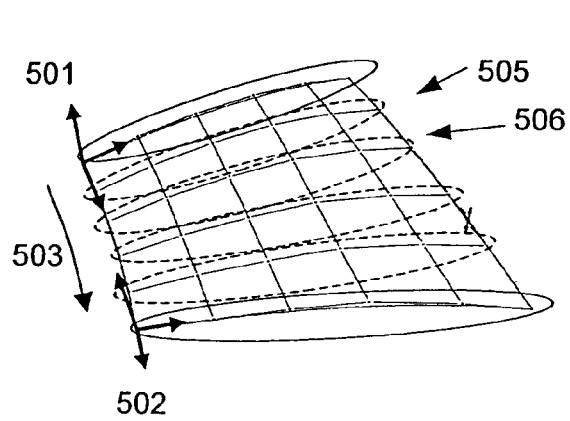
FIGS. 5A-B are illustrations of the Reference Axis method on a surface.
Figure 9:
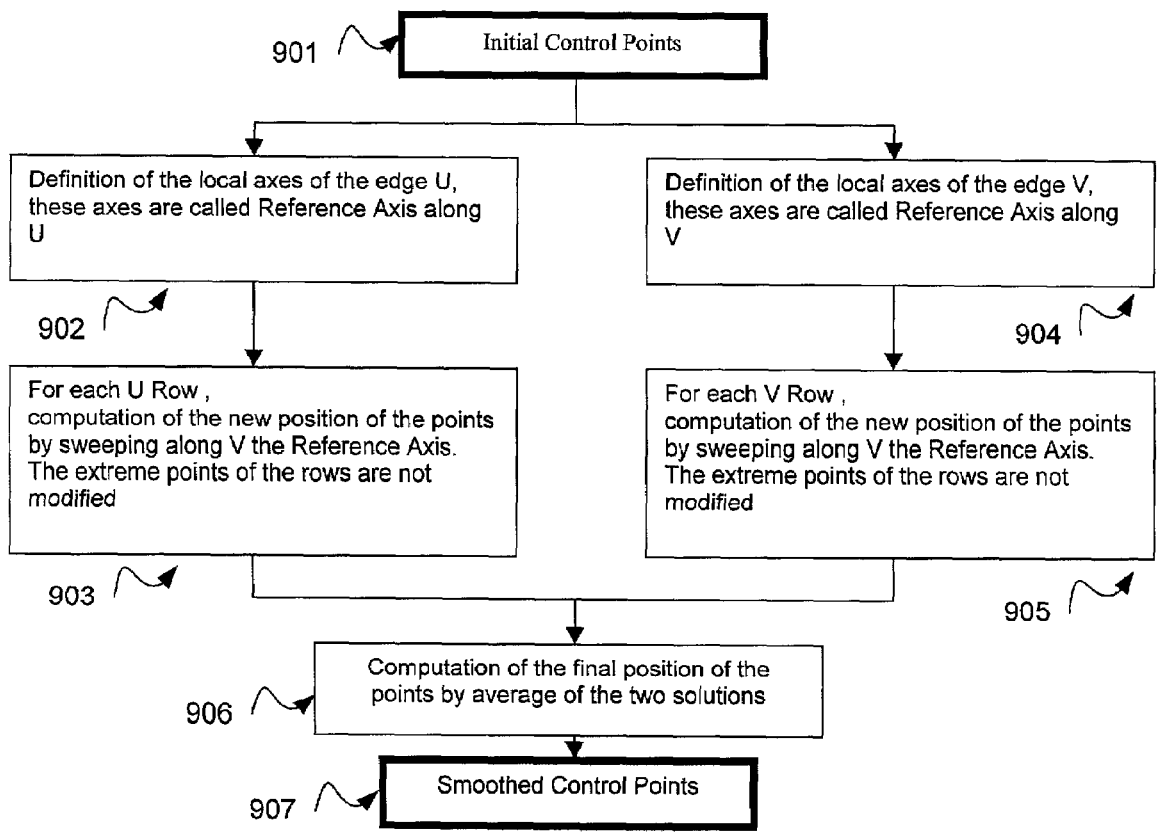
FIG. 9 is a flowchart of the smoothing method.

FIG. 9 presents the smoothing method and FIG. 5 is an illustration of this method. In this method, the position of the points of the rows are calculated by "sweeping" in the two directions of the network of points along the extreme local axis. As is shown in FIG. 5A, the method sweeps along the V direction 503. To implement the smoothing method, two local axes 501 and 502, located at the extreme edges and known as the Reference Axes, are computed 902.

Figure 3A:
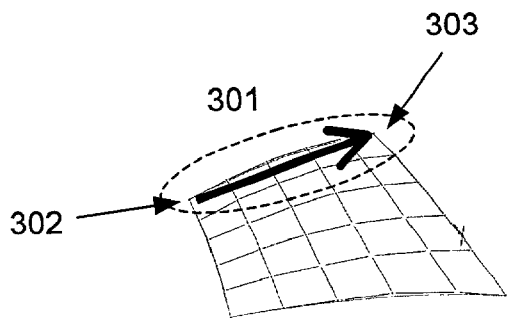
FIG. 3A-C is an illustration of the Reference Axis method.
Figure 3B:
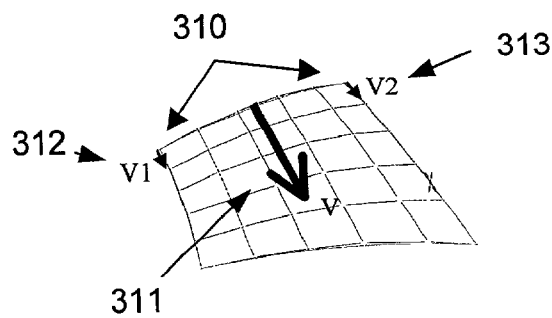
Figure 3C:
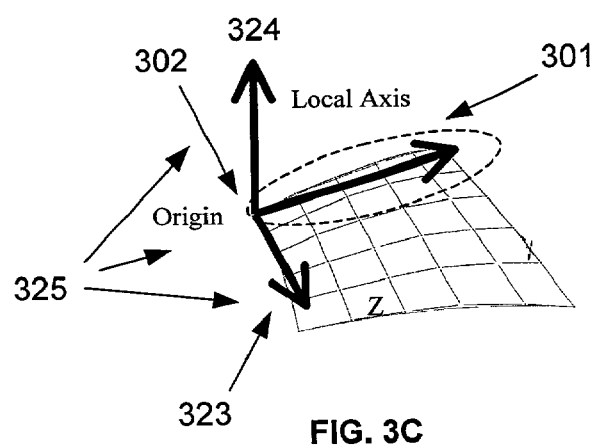
Figure 4:
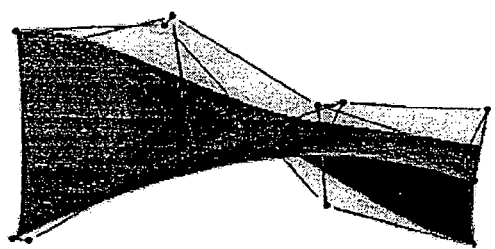
FIG. 4 is an illustration of a surface with control points.

Referring to FIG. 3, a local axis is defined using X 301, Y 324, and Z 323 axes. To compute the local axis, the origin 302 is taken to be coincident with one of the extreme points of one edge. The X direction 301 is defined by the other extremity of the same edge 303. Extreme vectors 310 are defined at each extremity of the edge by the extremity point 312 and 313 and its neighbor. The addition of these vectors gives the vector V 311. The V direction 311 is adjusted to be orthogonal to the X direction 301 to give the Z direction 323. The Y direction results from the vectorial product of the two proceeding directions 324.

After the Reference Axes are defined, the system takes each U row (for example, 505 and 506), and computes the new position of the points by using the Reference Axis to sweep along the V row 903. The extreme points of the rows are not modified. Each row is proportionally influenced by the edges depending on its position regarding these edges. The changed points can then be stored in the system. This smoothing technique can be based on a linear interpolation method, which can allow one edge to influence the control points more than other edges depending on the position of the control points relative to the edge.

Figure 13:
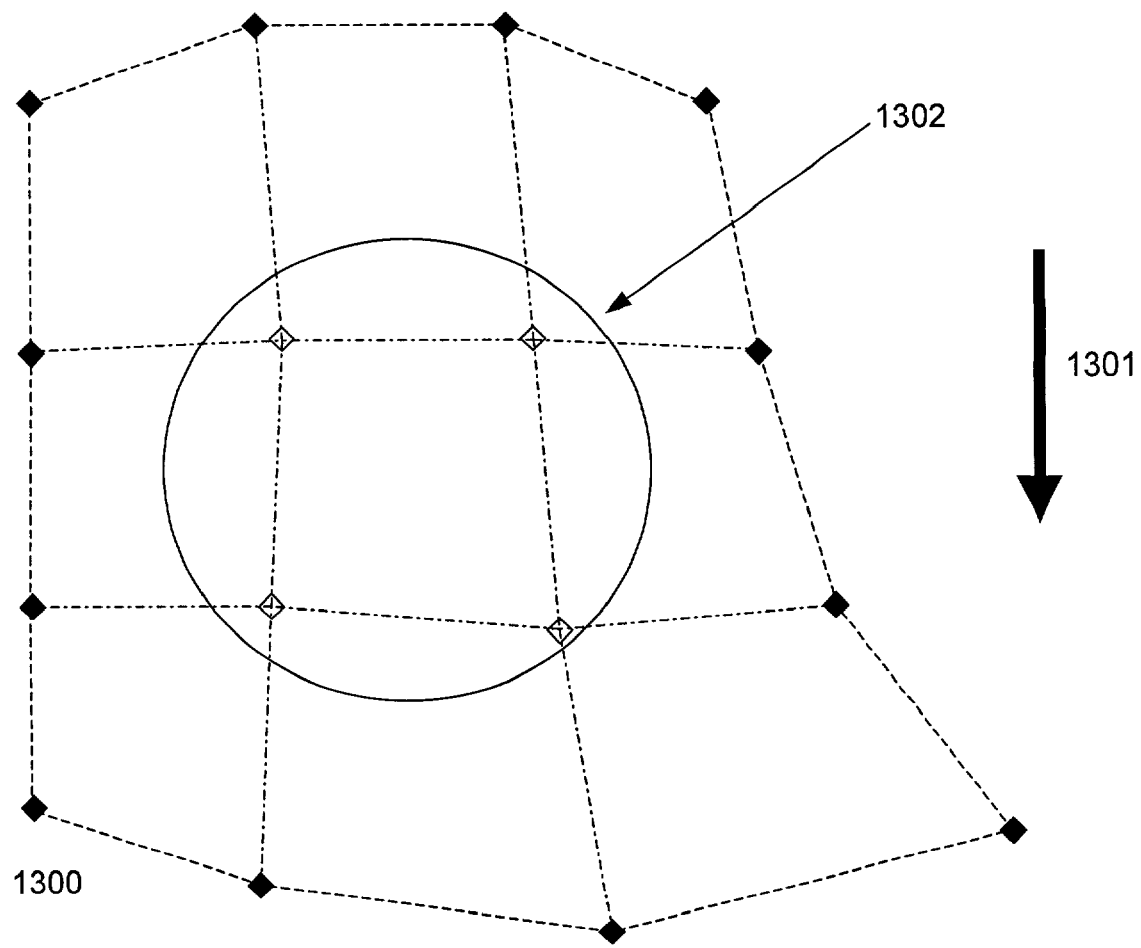
FIGS. 13-15 are illustrations of the smoothing method.

The following example shows one way that the Reference Axis can sweep along a row. A simple two-dimensional network of control points is used to illustrate this example. The method for the two-dimensional network of control points can be expanded to three or more dimensions, depending upon the desired application. FIG. 13 presents a simple, two-dimensional four by four network of control points 1300. The method will smooth the points contained in the circle 1302. The extremity points (those outside the circle) will remain unchanged.

Figure 14:
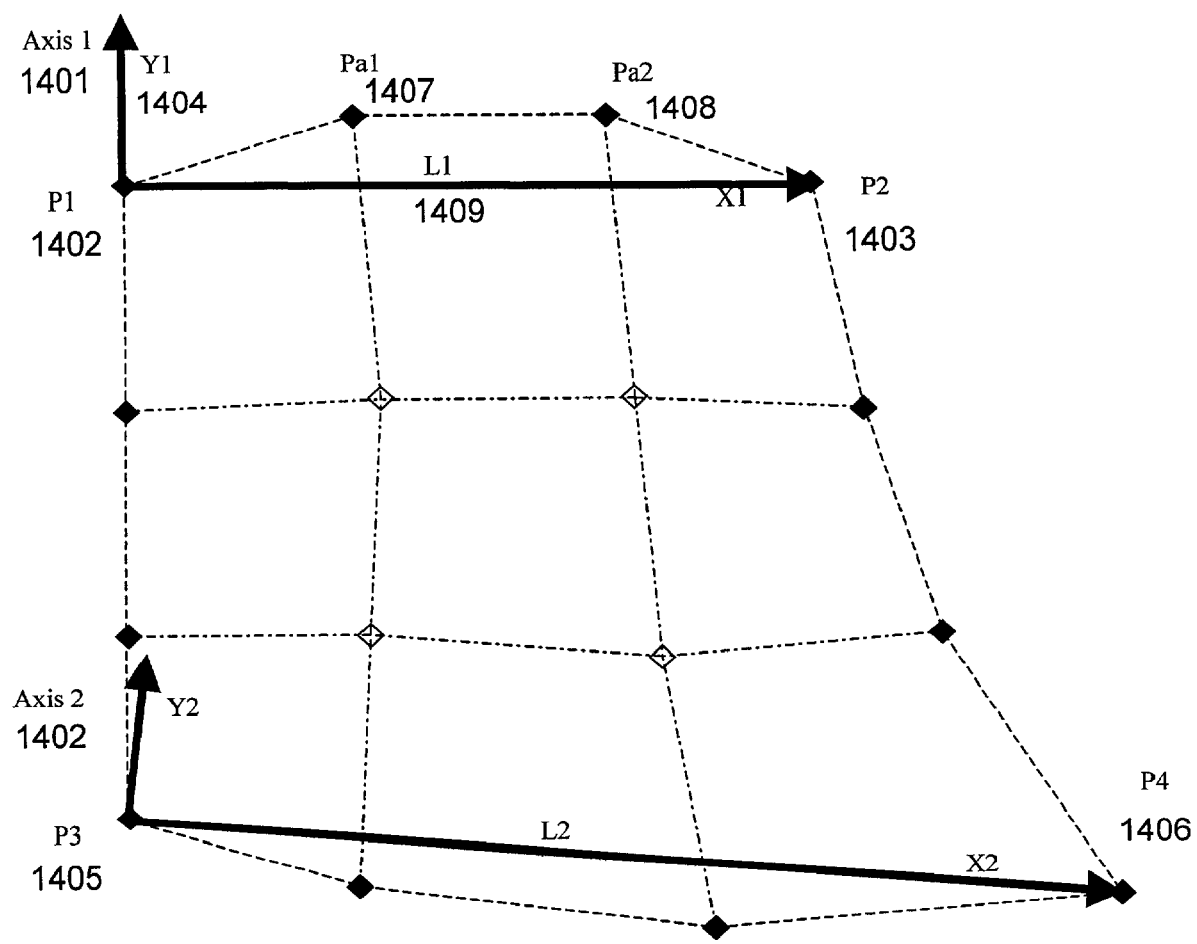

The two Reference Axes are defined as shown in FIG. 14. Axis 1 1401 is defined using the direction of the points P1 1402 and P2 1403. The second direction, Y1 1404, is orthogonal to the previous one. For this two-dimensional example, there are only two possible directions: up and down. Either one can be used, but for this example, the convention of taking the direction that is closest to one of the model axis directions is used. Therefore, up is chosen as the direction for Y1 1404. In the three-dimensional case, the Reference Axis is defined with three directions. In that case, the Z coordinate of the local axis can be computed using a vectorial product (Z=X^Y).

The second axis, Axis 2 1402, is defined the same way, except points P3 1405 and P4 1406 are used. The points Pa1 1407 and Pa2 1408 are then expressed in the Axis 1 1401 using a classical transformation from one axis to another. This process is repeated for Axis 2.

Figure 15:
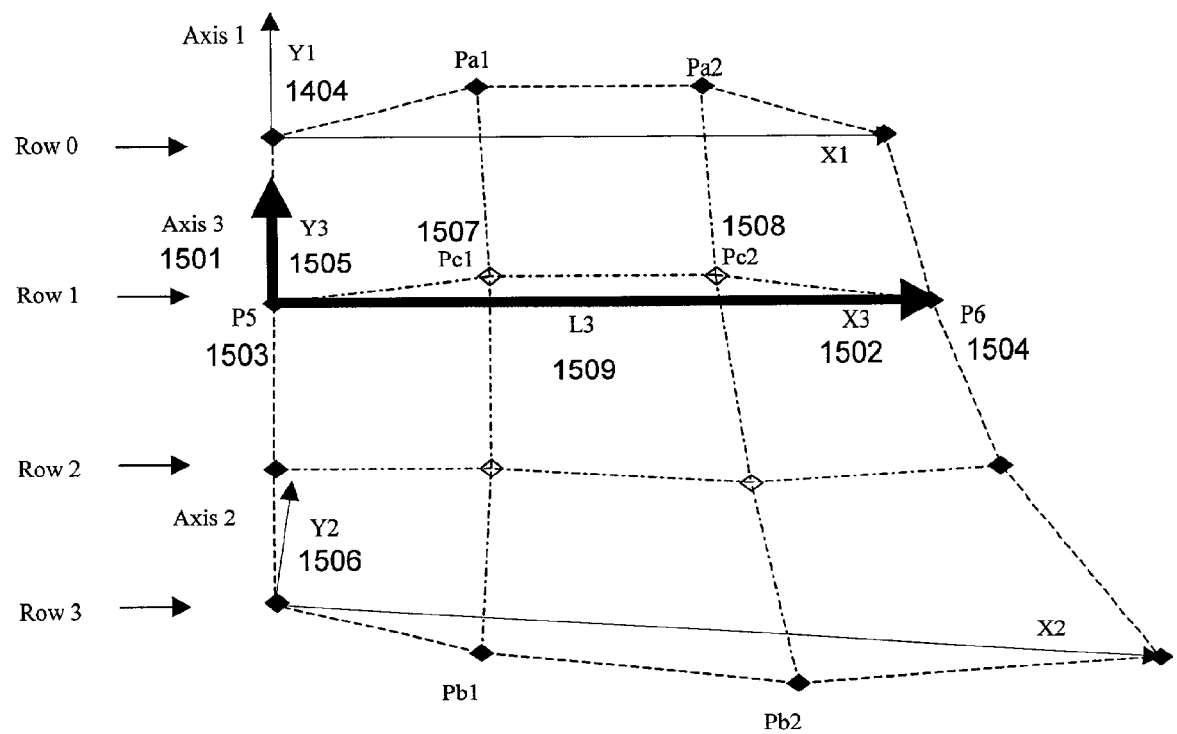

Next, the interpolations of the axes between the two extreme axes are calculated. Referring to FIG. 15, Axis 3 1501 can be defined using the following principle. The X3 direction 1502 is computed using the two extreme points P5 1503 and P6 1504. The Y3 direction 1505 is computed using Y1 1404 and Y2 1506, and two-coefficients depending on the row index. Equation 1 gives the formula for this calculation.

$$Y3 = Y1 \times C1 + Y2 \times C2 \qquad \text{Equation 1}$$

The Y3 direction is then adjusted to be exactly orthogonal to the X3 direction as shown in Equation 2.

$$X3 = (X3\char`\^Y3)\char`\^X3 \qquad \text{Equation 2}$$

The C1 and C2 coefficients represent the key point for interpolation. These coefficients can be expressed as the influence of the extreme axes on the internal ones. The coefficients are defined using the index of the row according to Equation 3.

$$C1 = \text{Row}/(\text{Number of Rows} - 1)$$

$$C2 = 1 - C1 \qquad \text{Equation 3}$$

The points Pc1 1507 and Pc2 1508 can then be computed using the coordinates of the points Pa1 1407 and Pb1 1408 in their respective axis, two coefficients that depend on the row index, and the length L3 1509 between P5 1503 and P6 1504 as shown in Equation 4.

$$Pc1 = Pa1 \times C1 + Pb1 \times C2$$

$$Pc1_x = Pc1 \times L3 \qquad \text{Equation 4}$$

The second equation presented in Equation 4 allows the correct coordinate along X for Pc1 to be computed. The coefficients again represent the influence of the extreme points on the internal ones. For example, in row number 1, $C1 = \frac{1}{3}$, and $C2 = 1 - \frac{1}{3} = \frac{2}{3}$. From this it is clear that point Pc1 is influenced with a magnitude of one-third by Pa1 and a magnitude of two-thirds by Pb1. The final points are obtained using the expression Pc1 and Pc2 in the model axis using a classical transformation from one axis to another. This process can be repeated for Row 2.

Figure 5B:
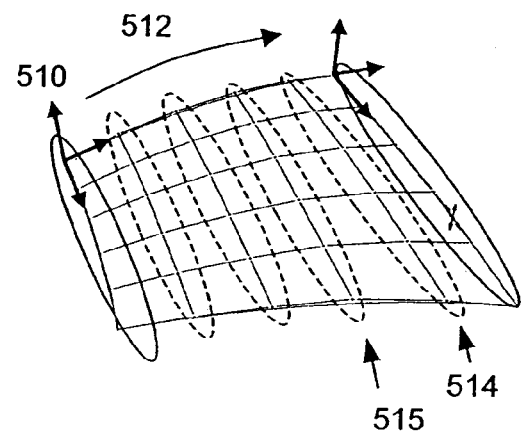

As is shown in FIG. 5B, the method also sweeps along the U 512 direction. The system first defines the Reference Axes 510 and 512 of the edge V 904. Then, for each V rows (for example 514 and 515), the system computes the new position of the points by sweeping the Reference Axis along edge V 905. The extreme points of the rows are not modified. The changed points can then be stored in the system.

After the changed points for sweeping along the V direction and sweeping along the U direction are calculated, the system computes a final position for the points by averaging the two solutions together 906. The internal network reproduces a harmonious evolution of the edges of this network. The sweeping method can be described as follow: each row is proportionally influenced by the edges depending on its position regarding these edges. The result of this step is smoothed control points 907.

Figure 6:
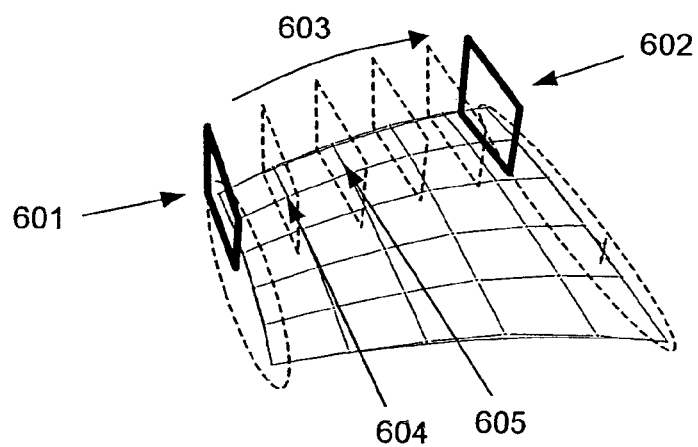
FIG. 6 is an illustration of the local plane detection method.
Figure 10:
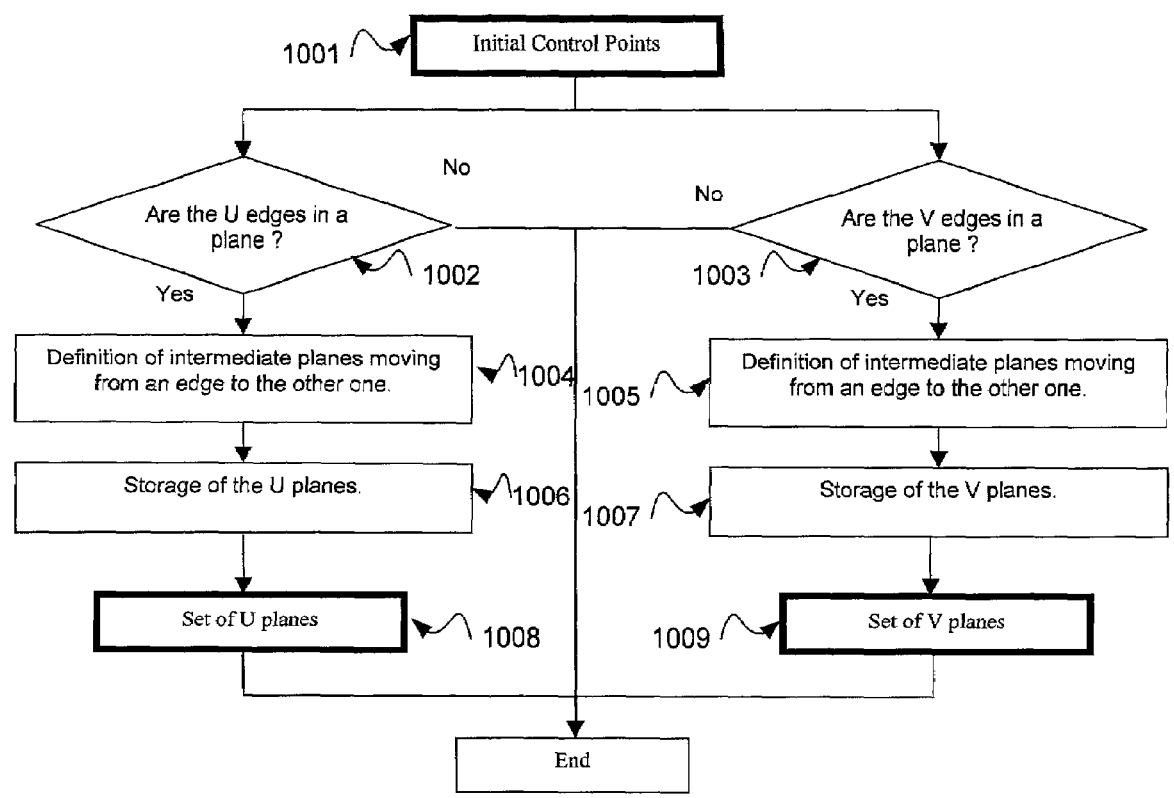
FIG. 10 is a flowchart of the local planes detection method.

FIG. 10 presents the local planes detection method and FIG. 6 is an illustration of this method. A local plane results if all points of a row are in a same plane. The planar detection can be completed using any common methods, such as the least square regression algorithm that determines the median plane. The detection of local planes begins with the initial control points of the surface 1001. The system determines if each extreme U edge 601 and 602 are along a plane 1002. If they are, the system defines intermediate planes by moving from one edge to the other edge along the U axis 1004. As the system sweeps the U axis 603, the system interpolates and stores the U planes (for example, 604 and 605) 1006. The methodology of interpolation can be the same as for the axis interpolation because a plane can be express like an axis (the two directions of the plane and its normal). What can result from this sweep is a set of U planes 1008. If either the first or second extreme U edges are not in a plane, then the system does nothing and no plane is stored.

The system also determines if the extreme V edges are along a plane 1003. If they are, the system defines intermediate planes by moving from one edge to the other edge along the V axis 1005. As it sweeps the V axes, the system interpolates and stores the V planes 1007. What can result from this sweep is a set of V planes 1009. If either the first or second extreme V edges are not in a plane, then the system does nothing and no plane is stored.

Figure 11:
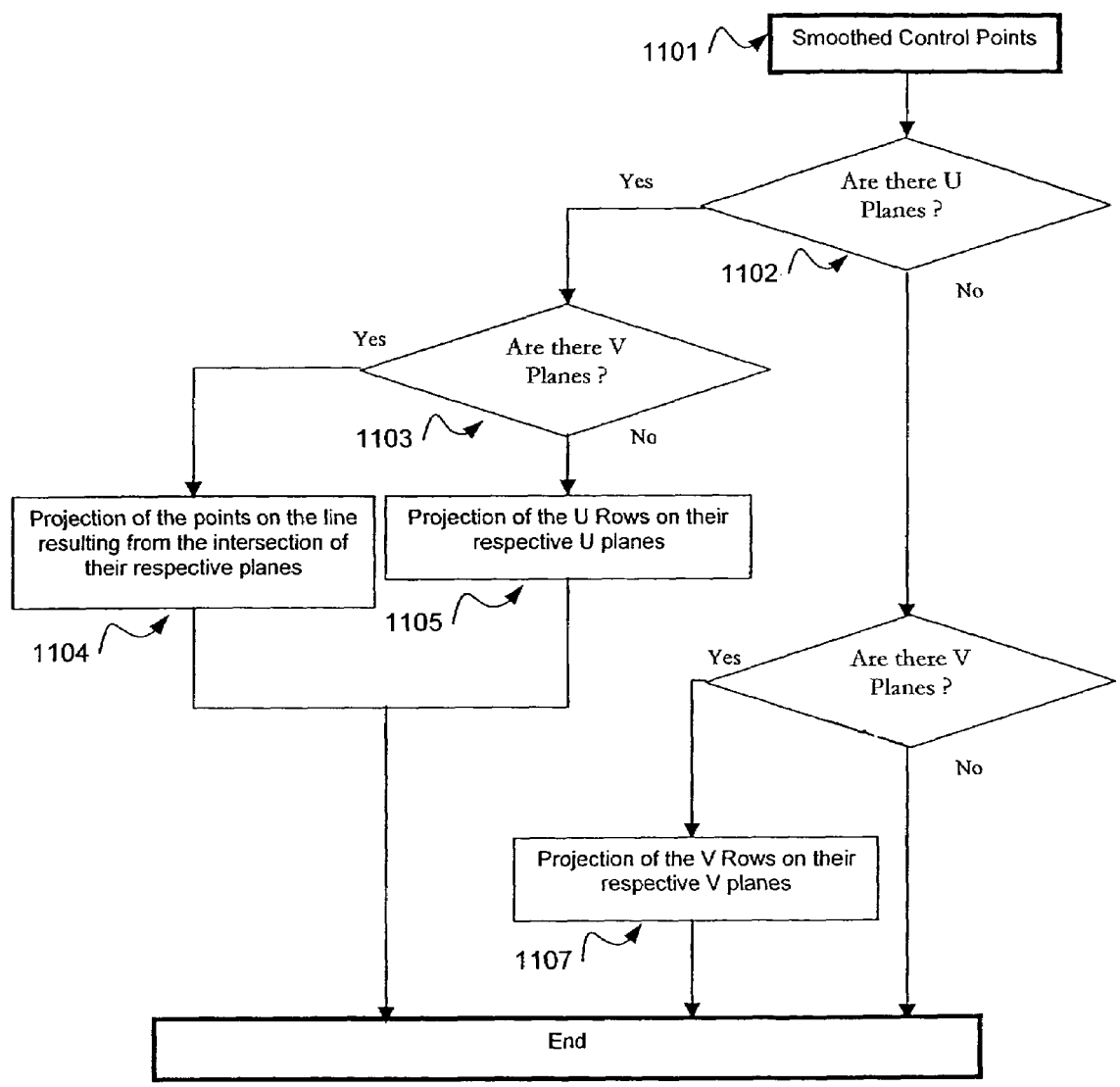
FIG. 11 is a flowchart of the plane projection method.

Referring to FIG. 11, the projection phase is used to improve the result of the smoothing phase according to the local planes, when they exist, by calculating projections on planes or on lines when two planes exist. When no local plane have been detected, no action is performed. This method begins with the smoothed control points 1101. The system determines if there are any U planes 1102. If there are U planes, the system determines if there are any V planes 1103. If there are U planes and V planes, the system projects the points on the line resulting from the intersection of the respective U and V planes 1104. If there are U planes, but no V planes, the system projects the U rows on their respective U planes 1105. If there are V planes, but no U planes, the system projects the V rows on their respective V planes 1107. The movement of each point based on this method will usually be slight.

Figure 16A:
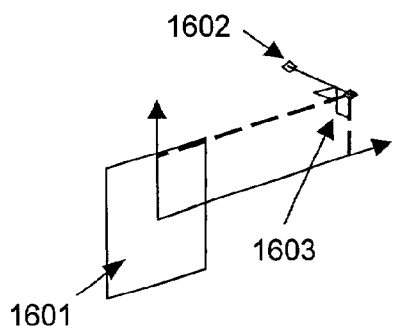
Figure 16B:
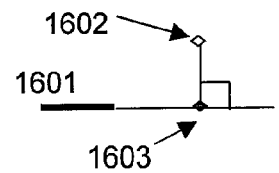

FIG. 16 presents examples of the two types of projections used in the projection phase. For a given control point, when there is only one plane (i.e., either the U plane 1105 or the V plane 1107) the point is projected onto the plane. FIG. 16A presents a side view of this projection. The original point 1602 is projected onto the plane 1601 using an orthogonal projection, which results in the projected point 1603. FIG. 16B shows this same projection from a top view.

In situations where there are two planes for a given control point (i.e., there is both a U plane and a V plane 1104), the point is projected on the line resulting from the intersection of the two planes. FIG. 16C presents a side view of this projection. The original point 1625 is projected onto an intersection line 1621. The intersection line is the result of the intersection of the first plane 1622 and the second plane 1623. The original point 1625 is projected onto the intersection line 1621 using an orthogonal projection, which results in the projected point 1624. FIG. 16D shows this same projection from a top view.

Figure 7:
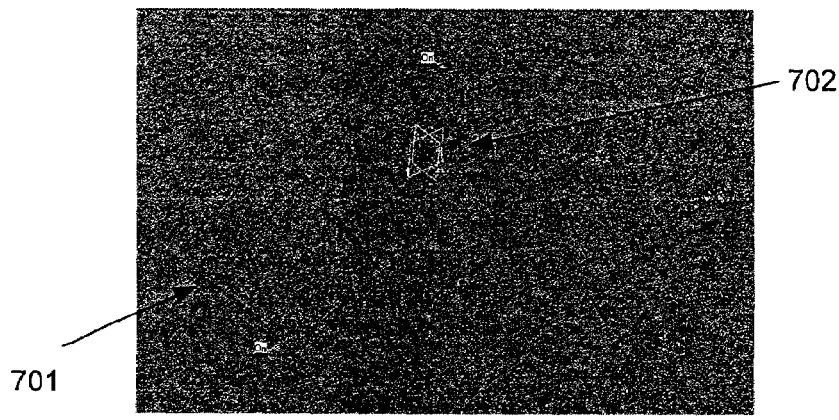
FIG. 7 is an illustration of deformation of points.

In another embodiment of this invention, a deformation process is presented. The goal of this process is to give the user a tool that deforms the control point surface, but maintains the characteristics of the surface. FIG. 7 shows the results of deforming a surface 701 by "pulling up" on a control point 702. As the control point is raised, the surrounding surface moves with the deformation. This allows the surface to maintain its particular characteristics.

Figure 12:
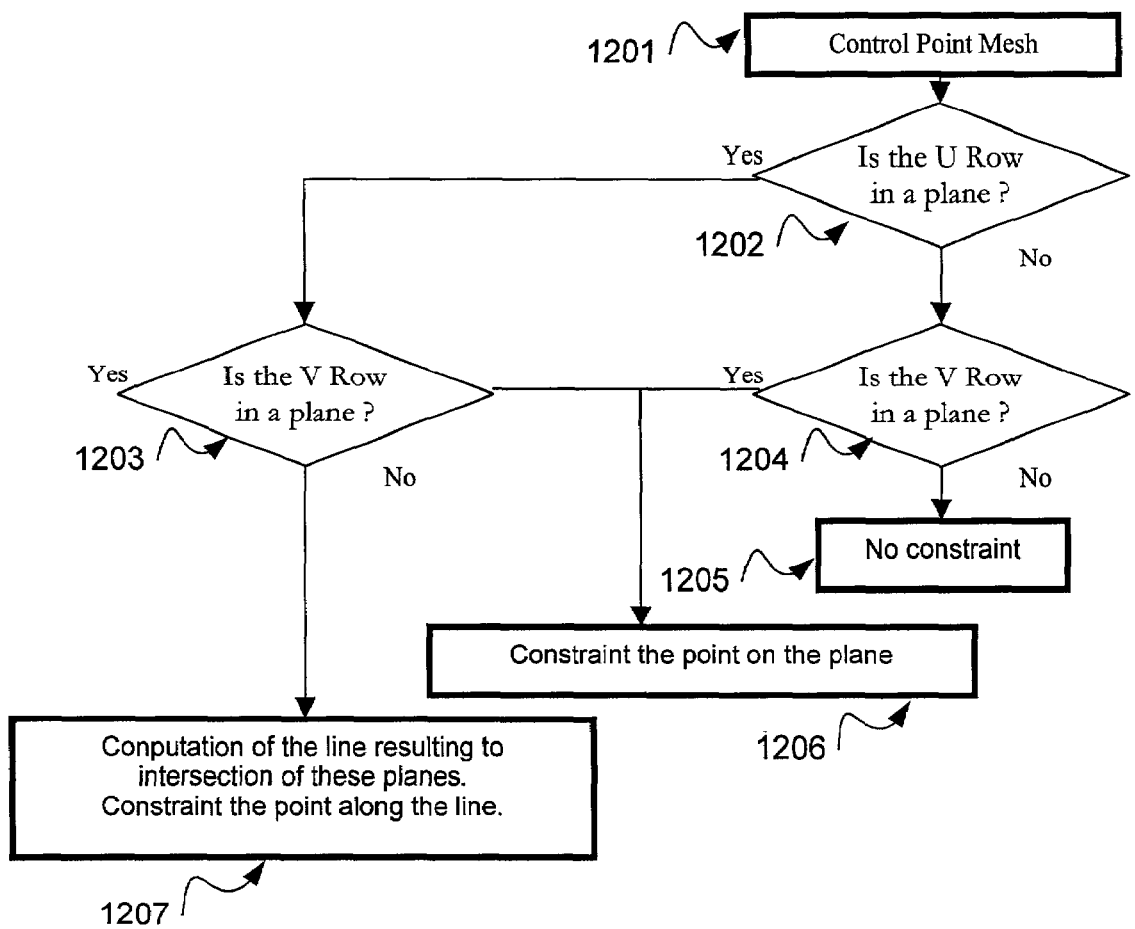
FIG. 12 is a flowchart of the deformation of points method.

FIG. 12 presents a flowchart for the deformation method. This method uses the control point mesh 1201. Considering a point to modify, this system computes the local planes along the two directions of the mesh. The system determines if the U row is in a plane 1202. If the U row is on a plane, the system then determines if the V row is in a plane 1203. If the U row and the V row are in a plane, the system computes a line resulting from the intersection of the two planes and constraints the point along this line 1207. If the U row is in a plane, but the V row is not in a plane, then the system constrains the point on the detected plane 1206. Similarly, if the U row is not on a plane, but the V row is on a plane 1204, then the system constrains the point on the detected plane 1206. If the U row and the V row are not on planes, then the system does not constrain the point 1205, and the translation of the point can be free. The determination of planes for this embodiment is the same as for the smoothing method.

These methods can be implemented on a single computer, a networked computer, or any computing device designed to work with CAD or similar design systems. A user-interface for the computing system can be used to allow designers to manipulate and harmonize a network of control points as described above.

A number of embodiments of the present invention have been described. Nevertheless, it will be understood that various modifications may be made without departing from the spirit and scope of the invention.

What is claimed is:

1. A computerized method for manipulating a plurality of control points, the plurality of control points defining a surface in a design for manufacture of parts and forming a plurality of rows along two non-parallel directions U and V, the method comprising:
    adjusting the position of a control point in an intermediary row in the U direction to provide a smooth transition from the row of control points corresponding to a first edge along the U direction to a row of control points corresponding to a second edge along the U direction while retaining positions of control points in said first and second edges;
    adjusting the position of the control point in an intermediary row in the V direction to provide a smooth transition from the row of control points corresponding to a first edge along the V direction to a row of control points corresponding to a second edge along the V direction while retaining positions of control points in said first and second edges; and
    computing the new position of the control point based on the corresponding adjusted positions of the control point in the intermediary row in the U direction and the control points in the intermediary row in the V direction;
    wherein the surface is selected from the group consisting of a Béziers surface and a Nurbs surface, and wherein the design for manufacture of parts is displayed in a CAD system.

2. The computerized method of claim 1 wherein the surface comprises a three-dimensional surface.

3. The computerized method of claim 1 wherein computing the new position additionally comprises averaging the adjusted position of the control point in the intermediary row in the U direction and the adjusted position of the control point in the intermediary row in the V direction.

4. The computerized method of claim 1 further comprising:
    determining a reference axis for the first edge along the U direction, the second edge along the U direction, the first edge along the V direction, and the second edge along the V direction, wherein the method of determining the reference axis comprises:
    for each edge:
        determining an X vector comprising a first vector point located at a first extremity of the edge and a second vector point located at a second extremity of the edge;
        determining a Z vector comprising the average of two extreme vectors orthogonally adjusted to the X vector, wherein the two extreme vectors comprise a vector formed by an extremity point and its neighbor; and
        determining a Y vector comprising the vectorial product of the X vector and the Z vector.

5. The computerized method of claim 4 wherein adjusting the position of a control point in an intermediary row in the U direction comprises adjusting the control point using the reference axis for the first edge along the U direction and the second edge along the U direction; and wherein adjusting the position of a control point in an intermediary row in the V direction further adjusting the control point using the reference axis for the first edge along the V direction and the second edge along the V direction.

6. The computerized method of claim 1 further comprising:
    determining if a row of control points corresponding to a first edge along the U direction belongs in a first U plane;
    determining if a row of control points corresponding to a second edge along the U direction belongs in a second U plane; and
    adjusting the control point using the first U plane and the second U plane, wherein the adjustment only occurs if the row of control points corresponding to the first edge along the U direction belongs in the first U plane and the row of control points corresponding to the second edge along the U direction belongs in the second U plane.

7. The computerized method of claim 6 further comprising:
    computing an adjusted U plane for the control point to provide a smooth transition between the first U plane and the second U plane; and
    wherein adjusting the control point using the first U plane and the second U plane comprises projecting the control point on the adjusted U plane.

8. The computerized method of claim 6 further comprising:
    determining if a row of control points corresponding to a first edge along the V direction belongs in a first V plane;
    determining if a row of control points corresponding to a second edge along the V direction belongs in a second V plane; and
    adjusting the control point using the first V plane and the second V plane, wherein the adjustment only occurs if the row of control points corresponding to the first edge along the V direction belongs in the first V plane and the row of control points corresponding to the second edge along the V direction belongs in the second V plane.

9. The computerized method of claim 8 further comprising:
    computing an adjusted V plane for the control point to provide a smooth transition between the first V plane and the second V plane;

wherein adjusting the control point using the first V plane and the second V plane comprises projecting the control point on the adjusted V plane.

10. The computerized method of claim 8 further comprising:
   computing an adjusted U plane for the control point to provide a smooth transition between the first U plane and the second U plane; and
   computing an adjusted V plane for the control point to provide a smooth transition between the first V plane and the second V plane.

11. The computerized method of claim 10 wherein adjusting the control point using the first U plane and the second U plane and adjusting the control point using the first V plane and the second V plane comprises projecting the control point on an intersection of the adjusted U plane and the adjusted V plane.

12. The computerized method of claim 1 further comprising repeating the first adjusting step, second adjusting step, and computing step for each point that is not along the first edge in the U direction, second edge in the U direction, third edge in the V direction, and fourth edge in the V direction.

13. A computerized method for manipulating a plurality of control points, the plurality of control points defining a surface in a design for manufacture of parts and forming a plurality of rows along two non-parallel directions U and V, the method comprising:
   determining if a row of control points corresponding to a first edge along the U direction belongs in a first U plane;
   determining if a row of control points corresponding to a second edge along the U direction belongs in a second U plane; and
   adjusting control points using the first U plane and the second U plane, wherein the adjustment only occurs if the row of control points corresponding to the first edge along the U direction belongs in the first U plane and the row of control points corresponding to the second edge along the U direction belongs in the second U plane;
   wherein the surface selected from the group consisting of a Béziers surface and a Nurbs surface, wherein the design for manufacture of parts is displayed in a CAD system.

14. The computerized method of claim 13 wherein the surface comprises a three-dimensional surface.

15. The computerized method of claim 13 further comprising:
   computing an adjusted U plane for the control point to provide a smooth transition between the first U plane and the second U plane;
   wherein adjusting the control point using the first U plane and the second U plane comprises projecting the control point on the adjusted U plane.

16. The computerized method of claim 13 further comprising:
   determining if a row of control points corresponding to a first edge along the V direction belongs in a first V plane;
   determining if a row of control points corresponding to a second edge along the V direction belongs in a second V plane; and
   adjusting the control point using the first V plane and the second V plane, wherein the adjustment only occurs if the row of control points corresponding to the first edge along the V direction belongs in the first V plane and the row of control points corresponding to the second edge along the V direction belongs in the second V plane.

17. The computerized method of claim 16 further comprising:
   computing an adjusted V plane for the control point to provide a smooth transition between the first V plane and the second V plane;
   wherein adjusting the control point using the first V plane and the second V plane comprises projecting the control point on the adjusted V plane.

18. The computerized method of claim 16 further comprising:
   computing an adjusted U plane for the control point to provide a smooth transition between the first U plane and the second U plane; and
   computing an adjusted V plane for the control point to provide a smooth transition between the first V plane and the second V plane.

19. The computerized method of claim 18 wherein adjusting the control point using the first U plane and the second U plane and adjusting the control point using the first V plane and the second V plane comprises projecting the control point on an intersection of the adjusted U plane and the adjusted V plane.

20. A computerized method for manipulating a plurality of control points, the plurality of control points defining a surface in a design for manufacture of parts and forming a plurality of rows along two non-parallel directions U and V, the method comprising:
   determining if a row of control points corresponding to a first edge along the U direction belongs in a first U plane;
   determining if a row of control points corresponding to a second edge along the U direction belongs in a second U plane; and
   constraining the control points using the first U plane and the second U plane, wherein the constraining only occurs if the row of control points corresponding to a first edge along the U direction belongs in the first U plane and the row of control points corresponding to the second edge along the U direction belongs in the second U plane;
   wherein the surface is selected from the group consisting of a Béziers surface and a Nurbs surface, and wherein the design for manufacture of parts is displayed in a CAD system.

21. The computerized method of claim 20 wherein the surface comprises a three-dimensional surface.

22. The computerized method of claim 20 further comprising:
   computing an adjusted U plane for the control point to provide a smooth transition between the first U plane and the second U plane;
   wherein constraining the control point using the first U plane and the second U plane comprises constraining the control point on the adjusted U plane.

23. The computerized method of claim 20 further comprising:
   determining if a row of control points corresponding to a first edge along the V direction belongs in a first V plane;
   determining if a row of control points corresponding to a second edge along the V direction belongs in a second V plane; and
   constraining the control point using the first V plane and the second V plane, wherein the constraining only occurs if the row of control points corresponding to a first edge along the V direction belongs in the first V plane and the row of control points corresponding to the second edge along the V direction belongs in the second V plane.

24. The computerized method of claim 23 further comprising:
computing an adjusted V plane for the control point to provide a smooth transition between the first V plane and the second V plane;
wherein adjusting the control point using the first V plane and the second V plane comprises constraining the control point on the adjusted V plane.

25. The method of claim 23 further comprising:
computing an adjusted U plane for the control point to provide a smooth transition between the first U plane and the second U plane; and
computing an adjusted V plane for the control point to provide a smooth transition between the first V plane and the second V plane.

26. The computerized method of claim 25 wherein constraining the control point using the first U plane and the second U plane and constraining the control point using the first V plane and the second V plane comprises constraining the control point to an intersection of the adjusted U plane and the adjusted V plane.

27. A computer system for manipulating a plurality of control points in a design for manufacture of parts, the plurality of control points forming a plurality of rows along two non-parallel directions U and V, the system comprising:
a computer, wherein the computer comprises a memory and a processor; and
executable software residing in the computer memory wherein the software is operative with the processor to:
adjust the position of a control point in an intermediary row in the U direction to provide a smooth transition from the row of control points corresponding to a first edge along the U direction to a row of control points corresponding to a second edge along the U direction while retaining positions of control points in said first and second edges;
adjust the position of the control point in an intermediary row in the V direction to provide a smooth transition from the row of control points corresponding to a first edge along the V direction to a row of control points corresponding to a second edge along the V direction while retaining positions of control points in said first and second edges; and
compute the new position of the control point based on the corresponding adjusted positions of the control point in the intermediary row in the U direction and the control points in the intermediary row in the V direction.

28. A computer system for manipulating a plurality of control points in a design for manufacture of parts, the plurality of control points forming a plurality of rows along two non-parallel directions U and V, the system comprising:
a computer, wherein the computer comprises a memory and a processor; and
executable software residing in the computer memory wherein the software is operative with the processor to:
determine if a row of control points corresponding to a first edge along the U direction belongs in a first U plane;
determine if a row of control points corresponding to a second edge along the U direction belongs in a second U plane; and
adjust the control point using the first U plane and the second U plane, wherein the adjustment only occurs if the row of control points corresponding to the first edge along the U direction belongs in the first U plane and the row of control points corresponding to the second edge along the U direction belongs in the second U plane.

29. A computer system for manipulating a plurality of control points in a design for manufacture of parts, the plurality of control points forming a plurality of rows along two non-parallel directions U and V, the system comprising:
a computer, wherein the computer comprises a memory and a processor; and
executable software residing in the computer memory wherein the software is operative with the processor to:
determine if a row of control points corresponding to a first edge along the U direction belongs in a first U plane;
determine if a row of control points corresponding to a second edge along the U direction belongs in a second U plane; and
constrain the control point using the first U plane and the second U plane, wherein the constraining only occurs if the row of control points corresponding to a first edge along the U direction belongs in the first U plane and the row of control points corresponding to the second edge along the U direction belongs in the second U plane.

* * * * *